United States Patent
Park et al.

(10) Patent No.: US 9,791,039 B1
(45) Date of Patent: Oct. 17, 2017

(54) APPARATUS AND METHOD FOR SHIFT CONTROL OF VEHICLE

(71) Applicant: Hyundai Motor Company, Seoul (KR)

(72) Inventors: Joonyoung Park, Seoul (KR); Chan Ho Lee, Seoul (KR); Jee Wook Huh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/363,222

(22) Filed: Nov. 29, 2016

(30) Foreign Application Priority Data

Mar. 29, 2016 (KR) .................. 10-2016-0037915

(51) Int. Cl.
| | |
|---|---|
| *B60W 10/11* | (2012.01) |
| *B60W 10/18* | (2012.01) |
| *F16H 61/02* | (2006.01) |
| *F16H 59/44* | (2006.01) |
| *F16H 59/54* | (2006.01) |
| *F16H 59/66* | (2006.01) |

(52) U.S. Cl.
CPC ......... *F16H 61/0213* (2013.01); *F16H 59/44* (2013.01); *F16H 59/54* (2013.01); *F16H 59/66* (2013.01); *F16H 2061/0227* (2013.01)

(58) Field of Classification Search
None
See application file for complete search history.

(56) References Cited

U.S. PATENT DOCUMENTS

| | | | |
|---|---|---|---|
| 7,668,638 B2 * | 2/2010 | Saeki | ................ B60K 31/0008 701/301 |
| 2009/0055062 A1 * | 2/2009 | Tsukada | ................ E02F 9/2253 701/56 |
| 2009/0228180 A1 * | 9/2009 | Yamada | .............. F16H 61/0213 701/55 |

FOREIGN PATENT DOCUMENTS

| | | |
|---|---|---|
| JP | 10-169486 A | 6/1998 |
| JP | 2015-209142 A | 11/2015 |
| JP | 2015-224691 A | 12/2015 |
| KR | 10-2014-0065073 A | 5/2014 |

* cited by examiner

*Primary Examiner* — Edwin A Young
(74) *Attorney, Agent, or Firm* — Mintz Levin Cohn Ferris Glovsky and Popeo, P.C.; Peter F. Corless

(57) ABSTRACT

An apparatus and method for a shift control of a vehicle are provided. The apparatus includes a road information obtaining unit that obtains road information of a road on which the vehicle is traveling and traffic information and a front vehicle detection unit that obtains front vehicle information including a speed of a front vehicle. A running state obtaining unit obtains an average running speed of the vehicle and determines whether the vehicle is traveling at a high constant speed based on the road information, the traffic information, and the average running speed. A shift controller adjusts a shift time of a transmission based on the front vehicle information when braking occurs during high constant speed traveling of the vehicle.

20 Claims, 4 Drawing Sheets

APPARATUS AND METHOD FOR SHIFT CONTROL OF VEHICLE

CROSS-REFERENCE TO RELATED APPLICATION

This application claims priority to and the benefit of Korean Patent Application No. 10-2016-0037915 filed in the Korean Intellectual Property Office on Mar. 29, 2016, the entire contents of which are incorporated herein by reference.

BACKGROUND (a) Field of the Disclosure

The present disclosure relates to an apparatus and method for a shift control of a vehicle, and more particularly, to an apparatus and method of shift control of a vehicle that prevents a generation power loss due to an unnecessary shift in a regenerative braking mode.

(b) Description of the Related Art

A hybrid vehicle is a vehicle that efficiently combines and drives two or more different power sources. In general, the hybrid vehicle uses an engine and a motor as power sources. Particularly, the hybrid vehicle uses a motor having a relatively good low speed torque characteristic as a main power source at a low speed, and uses a motor having a relatively good high speed torque characteristic as a main power source at a high speed. Accordingly, the hybrid vehicle stops an operation of an engine using fossil fuel and uses a motor as the main power source in a low speed section, thereby realizing improved fuel efficiency and a reduction in exhaust gas.

The hybrid vehicle may operate in an electric vehicle (EV) mode that is a pure EV mode in which power of a motor is used, a hybrid electric vehicle (HEV) mode in which a torque of an engine is used as main power and a torque of a motor is used as auxiliary power, and a regenerative braking (RB) mode in which, when the hybrid vehicle operates according to braking of a vehicle or inertia, braking and inertia energy are collected through generation of the motor and charged to a battery, etc.

A hybrid motor having a transmission disposed in a motor and a drive shaft requires a shift of the transmission to increase regeneration (generation) efficiency upon the regenerative braking. In other words, for the motor to drive at a peak power region and a maximum efficiency point in the regenerative braking mode, a shift is necessary according to a reduction in a vehicle speed upon the regenerative braking.

A vehicle may perform a torque intervention control that reduces a rotation toque of an input shaft of a transmission to achieve drivability during a shift. When the torque intervention control is performed due to the shift during the regenerative braking, loss of generation power occurs due to the regenerative braking. When a braking time is decreased such as when a vehicle is intermittently decelerated to maintain a distance between vehicles during high speed traveling, a shift for an optimal regenerative driving point of a motor may reduce a charging amount due to a power loss during the shift.

The above information disclosed in this section is merely for enhancement of understanding of the background of the disclosure and therefore it may contain information that does not form the prior art that is already known in this country to a person of ordinary skill in the art.

SUMMARY

The present disclosure provides an apparatus and method for a shift control of a vehicle having advantages of preventing a generation power loss due to an unnecessary shift in a regenerative braking mode and improving regenerative efficiency.

An exemplary embodiment of the present disclosure provides an apparatus for a shift control of a vehicle that may include: a road information obtaining unit configured to obtain road information regarding a road on which the vehicle is traveling and traffic information; a front vehicle detection unit configured to obtain front vehicle information including a speed of a front vehicle traveling in front of the vehicle; a running state obtaining unit configured to obtain an average running speed of the vehicle, and determining whether the vehicle is traveling at a high constant speed based on at least one of the road information, the traffic information, and the average running speed; and a shift controller configured to adjust a shift time of a transmission based on the front vehicle information when braking occurs during high constant speed traveling of the vehicle.

Yet another exemplary embodiment of the present disclosure provides a method for a shift control of a vehicle that may include: obtaining road information regarding a road on which the vehicle is traveling and traffic information; obtaining front vehicle information including a speed of a front vehicle traveling in front of the vehicle; obtaining an average running speed of the vehicle determining whether the vehicle is traveling at a high constant speed based on the road information, the traffic information, and the average running speed; and adjusting a shift time of a transmission based on at least one of the front vehicle information when braking occurs during high constant speed running of the vehicle.

According to an exemplary embodiment, a vehicle may be configured to detect an intermittent braking situation for maintaining a distance between vehicles in a high constant speed traveling state. In addition, an unnecessary shift may be minimized upon the intermittent braking, thereby minimizing a generation power loss due to a shift upon the braking. A shift may also be minimized by the intermittent braking, thereby improving drivability.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
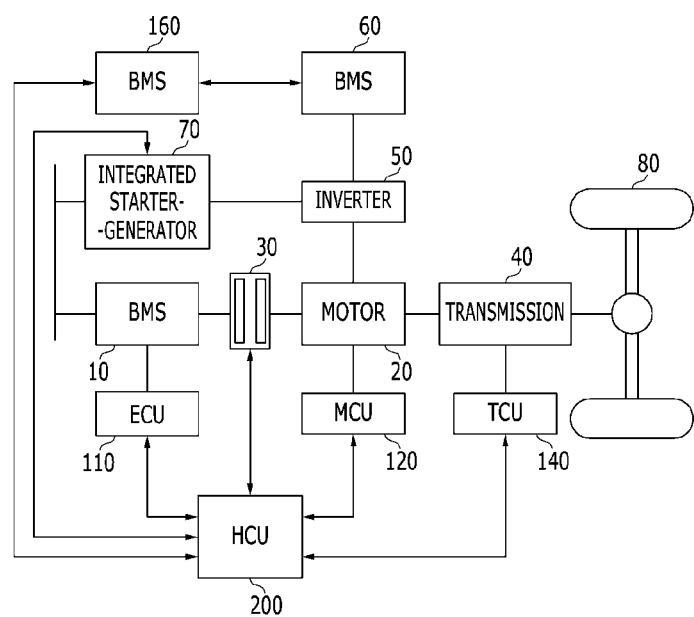
FIG. 1 is a diagram of a hybrid vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure will be described more fully hereinafter with reference to the accompanying drawings, in which exemplary embodiments of the disclosure are shown. As those skilled in the art would realize, the described exemplary embodiments may be modified in various different ways, all without departing from the spirit or scope of the present disclosure. The drawings and description are to be regarded as illustrative in nature and not restrictive. Like reference numerals designate like elements throughout the specification. Throughout this specification and the claims that follow, when it is described that an element is "coupled" to another element, the element may be "directly coupled" to the other element or "electrically coupled" to the other element through a third element.

FIG. 1 is a diagram of an example of a hybrid vehicle according to an exemplary embodiment. Referring to FIG. 1, the vehicle may include an engine 10, a motor 20, an engine clutch 30, a transmission 40, an inverter 50, a battery 60, an integrated starter-generator 70, wheels 80, etc.

Particularly, the engine 10 combusts fuel to generate power and the motor 20 supplements the power of the engine 10, operates as a generator upon braking, and generates electrical energy. The electrical energy generated by the motor 20 may be stored in the battery 60. The engine clutch 30 is connected between the engine 10 and the motor 20, and executes a power delivery between the engine 10 and the motor 20. The transmission 40 may be connected in series connected with the motor 20 to convert the power generated by the engine 10 into a necessary torque based on a speed, and deliver the torque to the wheels 80. The driving torque shifted by the transmission 40 may be delivered to the wheels 80 to drive the wheels 80.

The inverter 50 may be configured to convert a direct current (DC) voltage output by the battery 60 into an alternating current (AC) voltage to deliver the AC voltage to the motor 20 or the integrated starter-generator 70. The battery 60 may provide the driving power of the motor 20 and starting power of the integrated starter-generator 70 through the inverter 50. The integrated starter-generator 70 may be configured to start the engine 10 or perform generation by the torque of the engine 10. As the integrated starter-generator 70, a hybrid starter & generator (HSG), an integrated starter & generator (ISG), etc. may be included.

The hybrid vehicle according to an exemplary embodiment may include at least one controller such as a hybrid control unit (HCU) 200, an engine control unit (ECU) 110, a motor control unit (MCU) 120, a transmission control unit (TCU) 140, a battery management system (BMS) 160, etc. The HCU 200 may be a highest controller or upper controller and integrates and adjusts lower controllers connected over a network. The HCU 200 may be configured to collect and analyze information of each lower controller to execute entire operations of the hybrid vehicle. The ECU 110 may interwork with the HCU 200 connected via the network to execute a general operation of the engine 10 such as a torque control of the engine 10.

The MCU 120 may interwork with the HCU 200 connected via the network to execute a general operation of the motor 20. Additionally, the MCU 120 may execute a general operation of the integrated starter-generator 70. The TCU 140 may be configured to operate an actuator included in the transmission 40 in correspondence to a shift lever manipulation of a driver, etc., thereby adjusting a shift position of the transmission 40, i.e. a gear stage. The BMS 160 may be configured to collect and detect information such as a voltage of the battery 60, a current, a temperature, etc. to manage a state of charge (SOC) of the battery 60 and adjust a charged and discharged current amount of the battery 60 to prevent the battery 60 from being over-discharged to less than a voltage limit or over-charged to greater than the voltage limit.

The hybrid vehicle of the above-described structure may travel in an electric vehicle (EV) mode that is a pure EV mode in which power of the motor 20 is used, a hybrid electric vehicle (HEV) mode in which a torque of the engine 10 is used as main power and a torque of the motor 20 is used as auxiliary power, and a regenerative braking (RB) mode in which, when the hybrid vehicle is operated according to braking of a vehicle or inertia, braking and inertia energy are collected through generation of the motor 20 and charged to the battery 60, etc.

A shift control apparatus (see reference numeral 300 of FIG. 2 that will be described later) may be mounted within the hybrid vehicle. Constituent elements constituting the shift control apparatus 300 may be mounted in the HCU 200 of the hybrid vehicle or the TCU 140 but are not necessarily limited thereto. The constituent elements constituting the shift control apparatus 300 may be mounted in a controller, other than the HCU 200 of the hybrid vehicle or the TCU 140 or may be configured as a separate controller. Also, the constituent elements of the shift control apparatus 300 may be mounted in different controllers.

Figure 2:
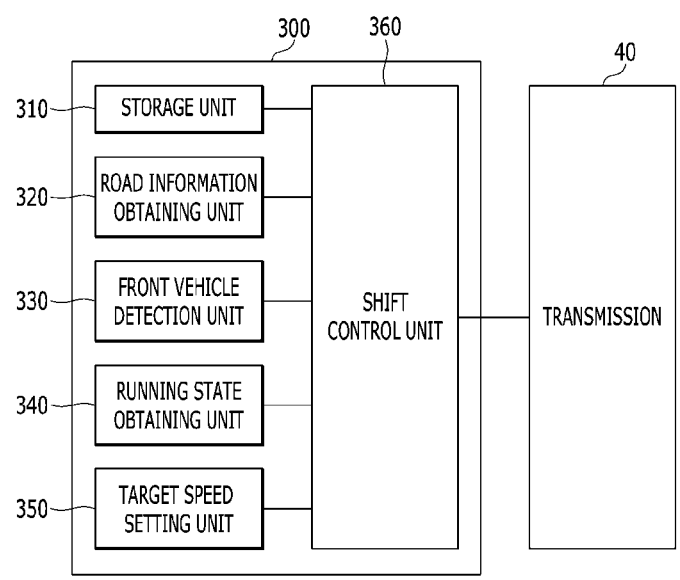
FIG. 2 is a schematic configuration diagram of an apparatus for a shift control of a vehicle according to an exemplary embodiment of the present disclosure.

An apparatus and method for a shift control of a vehicle according to exemplary embodiments will be described below with reference to necessary drawings. FIG. 2 is a schematic configuration diagram of an apparatus for a shift control of a vehicle according to an exemplary embodiment. Referring to FIG. 2, the shift control apparatus 300 according to an exemplary embodiment may include a storage unit 310, a road information obtaining unit 320, a front vehicle detection unit 330, a running state obtaining unit 340, a target speed setting unit 350, and a shift controller 360. An upper controller or general controller may be configured to operate the various components of the shift control apparatus 300.

The storage unit 310 may be configured to store a plurality of shift patterns. A shift pattern is patterning of a shift time of a vehicle in correspondence to a speed of the vehicle, a brake pedal pressure, etc. One of the plurality of shift patterns stored in the storage unit 310 may be a shift pattern (hereinafter referred to as a "shift pattern A") set to execute a shift early entry possible upon a deceleration to increase regenerative efficiency upon RB mode running. Another one of the plurality of shift patterns stored in the storage unit 310 may be a shift pattern (hereinafter referred to as a "shift pattern B") in preparation for intermittent braking during high constant speed running. The shift pattern B may be set to delay a shift entry compared to the shift pattern A upon the deceleration. In other words, the shift pattern B may be set to enter a shift at a low speed compared to the shift pattern A upon the deceleration.

The road information obtaining unit 320 may be configured to obtain road information regarding a road on which the vehicle is currently traveling and traffic information from a navigation system (not shown). The navigation system is an apparatus configured to obtain location information of a vehicle and provide a path guide service based on the location information. The road information may include a road type of a road on which a vehicle is currently traveling, a speed limit, etc. The traffic information may include an average speed of a road on which a vehicle is currently traveling, traffic jam information, etc. Additionally, the front vehicle detection unit 330 may be configured to detect a front vehicle traveling in front of the vehicle (e.g., the subject vehicle) using a front sensor (not shown). The front sensor may be installed in front of a vehicle and may include at least one sensor configured to detect a distance from a front vehicle such as radar, a lidar, an ultrasonic wave sensor, etc.

The vehicle detection unit 330 may be configured to obtain front vehicle information including a distance from the front vehicle, a current speed of the front vehicle, an acceleration of the front vehicle, etc. The vehicle detection unit 330 may further be configured to obtain a distance between the front vehicle and the vehicle based on sensing information of the front sensor. Additionally, the vehicle detection unit 330 may be configured to obtain a current speed of the front vehicle and an acceleration based on a distance change between the front vehicle and the vehicle and the current speed of the vehicle.

The running state obtaining unit 340 may be configured to detect a current running state of the vehicle. For example, the running state obtaining unit 340 may be configured to obtain a current speed of the vehicle. Additionally, the running state obtaining unit 340 may be configured to obtain an average running speed of the vehicle in a recent predetermined section based on the current speed of the vehicle. For example, the running state obtaining unit 340 may be configured to monitor a brake pedal sensor (BPS) to detect a braking state of the vehicle (e.g., an engagement amount of the pedal). For example, the running state obtaining unit 340 may be configured to determine whether the vehicle is currently traveling at a high constant speed (e.g. about 65 to 80 mph) based on the road information and the traffic information obtained by the road information obtaining unit 320. The running state obtaining unit 340 may further be configured to determine that a current traveling state of the vehicle is a high constant speed running state when conditions below are satisfied.

Firstly, to determine that the traveling state of the vehicle is the high constant speed running state, the type of the road on which the vehicle is currently traveling is a road for the exclusive use of motor vehicles such as a highway. Additionally, to determine that the traveling state of the vehicle is the high constant speed running state, the speed limit of the road in which the vehicle is currently traveling is greater than a reference value and a traffic flow of the road has to be smooth (e.g., low traffic conditions). To determine that the traveling state of the vehicle is the high constant speed traveling state, the average traveling speed of the vehicle obtained by the running state obtaining unit 340 is greater than a reference value.

Furthermore, the target speed setting unit 350 may be configured to set a target speed of the vehicle based on the current speed of the front vehicle to avoid collision with the front vehicle when the front vehicle is detected using the front vehicle detection unit 330. In particular, in response to determining that the vehicle is currently traveling at the high constant speed by the running state obtaining unit 340, the target speed setting unit 350 may be configured to set the target speed of the vehicle based on the current speed of the front vehicle.

The shift controller 360 may be configured to adjust a shift time of the transmission 40 based on the target speed set by the target speed setting unit 350, the current speed of the front vehicle, or the acceleration of the front vehicle, etc. when the braking of the vehicle occurs. In particular, when the braking occurs in the high constant speed traveling state of the vehicle, the shift controller 360 may be configured to determine whether the braking is intermittent braking based on the current speed and the acceleration of the front vehicle and determine whether there is a shift entry of the transmission 40 according to a result of determination.

For example, when the braking occurs in the high constant speed traveling state, the shift controller 360 may be configured to determine that the currently occurred braking is the intermittent braking to maintain a distance between vehicles when the front vehicle is not decelerating (e.g., the brake pedal is disengaged) and the current speed of the front vehicle is within a speed range that corresponds to a current gear stage in the shift pattern B. In the intermittent braking, the braking of the vehicle is generally stopped near the target speed, i.e., near the current speed of the front vehicle. Therefore, when the shift controller 360 determines that the braking that occurs in the high constant speed traveling state is the intermittent braking, the shift controller 360 may be configured to operate the transmission 40 by using the shift pattern B, and thus the shift time of the transmission 40 may be delayed or the shift thereof may be prevented, thereby preventing a generation power loss due to the shift.

Additionally, as another example, when the braking occurs in the high constant speed traveling state and when the current speed of the front vehicle is beyond the speed range that corresponds to the current gear stage in the shift pattern B, the shift controller 360 may be configured to determine that a continuous braking is necessary to avoid collision with the front vehicle and determine that the currently occurred braking is not the intermittent braking. In particular, even though the shift pattern B is used, the target speed is beyond a speed range of the current gear stage, and thus the shift occurs. Therefore, the shift controller 360 may be configured to operate the transmission 40 to early enter the shift using the shift pattern A, thereby improving regenerative braking efficiency.

When the front vehicle is decelerating (e.g., the brake pedal is engaged) when the braking occurs in the high constant speed traveling state, the shift controller 360 may be configured to continuously decelerate the vehicle in accordance with the speed of the front vehicle and thus may determine that the currently occurred braking is not the intermittent braking. Therefore, the shift controller 360 may be configured to operate the transmission 40 to early enter the shift by using the shift pattern A, thereby improving the regenerative braking efficiency.

Further, when the braking occurs in the high constant speed traveling state and when the current speed of the front vehicle is less than a reference value, the shift controller 360 may be configured to continuously decelerate the vehicle in accordance with the speed of the front vehicle and thus may determine that the currently occurred braking is not the intermittent braking. Therefore, the shift controller 360 may be configured to operate the transmission 40 to early enter the shift by using the shift pattern A, thereby improving the regenerative braking efficiency.

Meanwhile, when the braking occurs in a low speed traveling state of the vehicle, since the shift controller 360 necessarily needs the shift for re-acceleration after the braking, the shift controller 360 may be configured to execute the shift of the transmission 40 using one shift pattern (e.g., the shift pattern A or B) irrespective of whether the currently occurred braking is the intermittent braking. Additionally, when the braking occurs in a situation where the front vehicle is not detected, since it may be difficult to determine the situation, the shift controller 360 may be configured to execute the shift of the transmission 40 using the shift pattern A.

In the shift control apparatus 300 of the above-described structure, the road information obtaining unit 320, the front vehicle detection unit 330, the running state obtaining unit 340, the target speed setting unit 350, and the shift controller 360 may be performed by one or more central processing units (CPUs) or a processor implemented as other chip sets, a microprocessor, etc.

Figure 3:
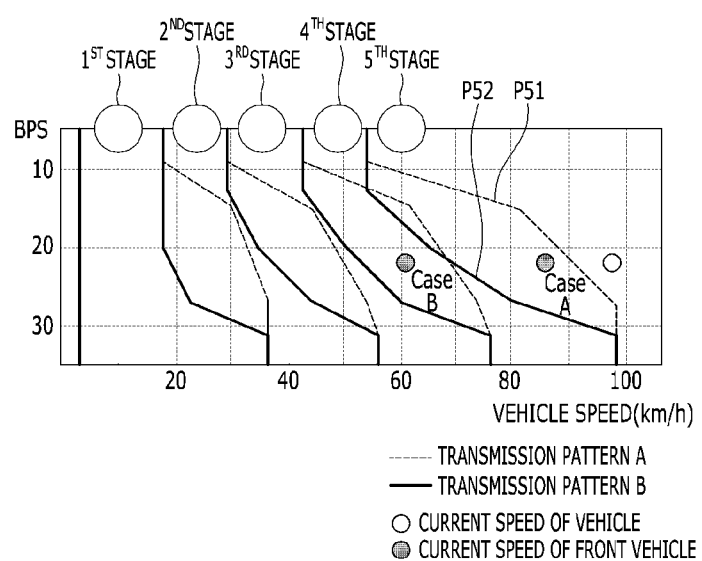
FIG. 3 is a diagram for describing a method for selecting a shift pattern in an apparatus for a shift control according to an exemplary embodiment of the present disclosure.

FIG. 3 is a diagram for describing a method for selecting a shift pattern in an apparatus for a shift control according to an exemplary embodiment. In FIG. 3, an X axis is a vehicle speed and a Y axis corresponds to a brake pedal pressure measured by a brake pedal sensor (e.g. the amount of pressure exerted onto the pedal). The shift patterns A and B are respectively indicated as a dotted line and a solid line. The dotted line and the solid line respectively indicate the brake pedal pressure at which a shift occurs for each gear stage and the vehicle speed. FIG. 3 shows an example when a vehicle is in a high constant speed traveling state and a current gear stage of the vehicle is a $5^{th}$ stage when the braking occurs, wherein P51 and P52 denote a brake pedal pressure that is a boundary of the $5^{th}$ stage and a $4^{th}$ stage and a vehicle speed, respectively.

In FIG. 3, Case A indicates that a current speed of a front vehicle is within a speed range that corresponds to a current gear stage (the $5^{th}$ stage) in the shift pattern B upon the braking of the vehicle, and Case B indicates that the current speed of the front vehicle is beyond the speed range that corresponds to the current gear stage in the shift pattern B upon the braking of the vehicle.

In Case A, the shift controller 360 may be configured to determine that the currently occurred braking is intermittent braking for maintaining a distance between vehicles. Accordingly, the shift controller 360 may be configured to execute a shift of the transmission 40 using the shift pattern B, thereby preventing the shift from occurring during regenerative braking. In Case B, since the current speed of the front vehicle is beyond the speed range corresponding to the current gear stage in the shift pattern B, even though the shift pattern B is used, the shift occurs. Accordingly, the shift controller 360 may be configured to determine that the currently occurred braking is not the intermittent braking and execute the shift of the transmission 40 using the shift pattern A, thereby allowing the transmission 40 to enter an early shift.

Figure 4:
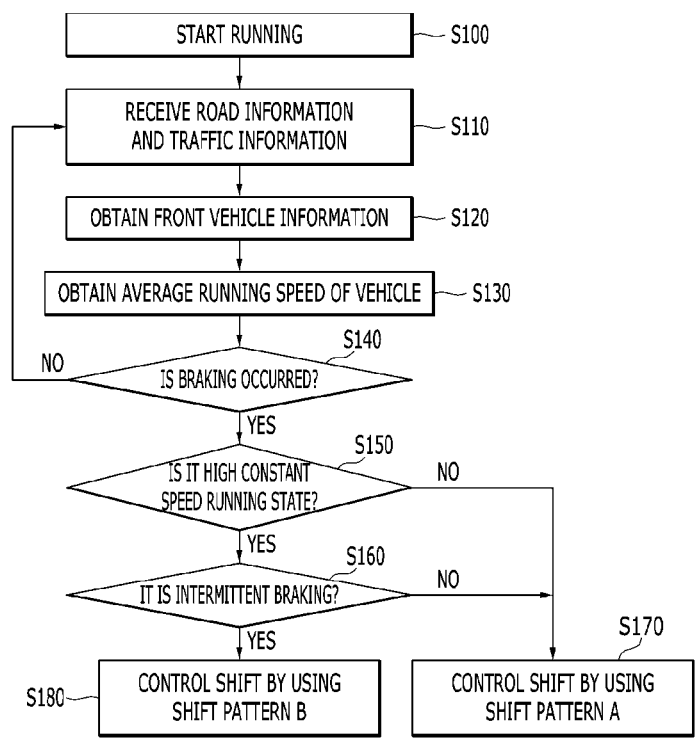
FIG. 4 is a schematic flowchart of a method for a shift control of a vehicle according to an exemplary embodiment of the present disclosure.

FIG. 4 is a schematic flowchart of a method for a shift control of a vehicle according to an exemplary embodiment. The method for the shift control of FIG. 4 may be performed by a controller of the shift control apparatus 300 described with reference to FIG. 2. Referring to FIG. 4, when the vehicle starts traveling (S100), the shift control apparatus 300 may be configured to receive road information regarding a road on which the vehicle is currently traveling and traffic information from a navigation system through the road information obtaining unit 320 (S110). Additionally, the shift control apparatus 300 may be configured to obtain front vehicle information of a front vehicle traveling in front of the vehicle through the front vehicle detection unit 330 (S120) and obtain an average running speed of the vehicle in a recent predetermined section (S130).

When the braking occurs during traveling of the vehicle (S140), the shift control apparatus 300 may be configured to determine that a traveling state of the vehicle is a high constant speed traveling state upon occurrence of the braking (S150). In step S150, the shift control apparatus 300 may be configured to determine the high constant speed traveling state of the vehicle based on the road information, the traffic information that are obtained from the navigation system, and the average traveling speed of the vehicle. When the road on which the vehicle is currently traveling is a road for the exclusive use of motor vehicles such as a highway having a speed limit greater than a reference value, a traffic flow of the road in which the vehicle is traveling is smooth (e.g., low congestion), and an average traveling speed of the vehicle is greater than a reference value, the shift control apparatus 300 may be configured to determine that the vehicle is currently traveling at a high constant speed.

When the shift control apparatus 300 determines that the vehicle is currently traveling at the high constant speed, the shift control apparatus 300 may be configured to determine whether the currently occurred braking is intermittent braking for maintaining a distance between vehicles based on the front vehicle information (S160). In step S160, when the front vehicle is not decelerating and a current speed of the front vehicle is within a speed range that corresponds to a current gear stage in the shift pattern B, the shift control apparatus 300 may be configured to determine that the currently occurred braking is the intermittent braking for maintaining the distance between vehicles.

In step S160, when the current speed of the front vehicle is beyond the speed range corresponding to the current gear stage in the shift pattern B, the shift control apparatus 300 may be configured to determine that the vehicle is not an intermittent braking situation. Additionally, when a current vehicle speed of the front vehicle is a low speed less a reference or the front vehicle is decelerating, the shift control apparatus 300 may be configured to determine that the vehicle is not the intermittent braking situation. In response to determining that the traveling state of the vehicle is not a high constant speed traveling state in step S150 or is not the intermittent braking situation in step S160, the shift control apparatus 300 may be configured to determine that a braking time increases and thus a shift is necessary. Accordingly, the shift control apparatus 300 may be configured to execute a shift of the transmission 40 using the shift pattern A in which a shift early entry is possible upon deceleration of the vehicle (S170). Accordingly, the transmission 40 may enter an early shift, thereby improving regenerative braking efficiency.

Further, in response to determining that the vehicle is in the high constant speed traveling state and, in step S160, the vehicle is in the intermittent braking situation requiring no shift, the shift control apparatus 300 may be configured to execute the shift of the transmission 40 using the shift pattern B (S180). Accordingly, a shift time of the vehicle due to the intermittent braking may be delayed or inhibited, thereby preventing a generation power loss due to the shift.

According to the above-described exemplary embodiment, the shift control apparatus 300 may be configured to detect an intermittent braking situation for maintaining a distance between vehicles in the high constant speed traveling state. Additionally, an unnecessary shift may be minimized upon the intermittent braking, thereby minimizing a generation power loss due to a shift upon the braking. A shift may also be minimized by the intermittent braking, thereby improving drivability.

The method for the shift control of the vehicle according to an exemplary embodiment of the present disclosure may be performed through software. When the method is performed through software, constituent elements of the present disclosure are code segments that execute a necessary process. A program or the code segments may be stored in a non-transitory processor readable medium or may be transmitted by a transmission medium or a computer data signal coupled to a carrier wave in a communication network.

The referred drawings and the described detailed description of the disclosure above are merely examples of the present disclosure, and are merely used to describe the present disclosure and are not used to limit the meaning or the scope of the present disclosure described in the claims. Therefore, one of ordinary skill in the art may be easily select and replace therefrom. Also, one of ordinary skill in the art may omit some of the constituent elements described in the present specification without deterioration of performance or may add constituent elements for improving the performance. Furthermore, one of ordinary skill in the art may change a sequence of steps of the method described in the present specification according to a process environment or equipment. Accordingly, the scope of the present disclosure should be determined by the claims and its equivalents not by the described exemplary embodiments.

While this disclosure has been described in connection with what is presently considered to be exemplary embodiments, it is to be understood that the disclosure is not limited to the disclosed exemplary embodiments, but, on the contrary, is intended to cover various modifications and equivalent arrangements included within the spirit and scope of the appended claims.

What is claimed is:

1. An apparatus for a shift control of a vehicle, comprising:
    a road information obtaining unit configured to obtain road information regarding a road on which the vehicle is traveling and traffic information;
    a front vehicle detection unit configured to obtain front vehicle information including a speed of a front vehicle traveling in front of the vehicle;
    a running state obtaining unit configured to obtain an average traveling speed of the vehicle, and determine whether the vehicle is traveling at a high constant speed based on at least one of the road information, the traffic information, and the average traveling speed; and
    a shift controller configured to adjust a shift time of a transmission based on the front vehicle information when braking occurs during high constant speed traveling of the vehicle.

2. The apparatus of claim 1, wherein when braking occurs during high constant speed traveling of the vehicle and when the front vehicle is not decelerating and a speed of the front vehicle is within a predetermined range, the shift controller is configured to delay the shift time of the transmission.

3. The apparatus of claim 2, wherein when braking occurs during high constant speed running of the vehicle and when the front vehicle is decelerating or a speed of the front vehicle is beyond a predetermined range, the shift controller is configured to operate the transmission to enter an early shift.

4. The apparatus of claim 1, further comprising:
    a storage unit configured to store a first shift pattern and a second shift pattern set to delay the shift time upon deceleration compared to the first shift pattern,
    wherein, when braking occurs during high constant speed traveling of the vehicle, the shift controller is configured to adjust the shift time of the transmission using one of the first and second shift patterns according to the front vehicle information.

5. The apparatus of claim 4, wherein when braking occurs during high constant speed traveling of the vehicle and when the front vehicle is not decelerating and a speed of the front vehicle is within a speed range that corresponds to a current gear stage of the vehicle in the second shift pattern, the shift controller is configured to adjust the shift time of the transmission using the second shift pattern.

6. The apparatus of claim 4, wherein when braking occurs during high constant speed traveling of the vehicle and when the front vehicle is decelerating, the shift controller is configured to adjust the shift time of the transmission using the first shift pattern.

7. The apparatus of claim 4, wherein when braking occurs during high constant speed running of the vehicle and when a speed of the front vehicle is beyond a speed range that corresponds to a current gear stage of the vehicle in the second shift pattern, the shift controller is configured to adjust the shift time of the transmission using the first shift pattern.

8. The apparatus of claim 4, wherein when braking occurs during high constant speed running of the vehicle and when a speed of the front vehicle is less than a reference value, the shift controller is configured to adjust the shift time of the transmission using the first shift pattern.

9. The apparatus of claim 4, wherein when braking occurs while the front vehicle is not detected by the front vehicle detection unit, the shift controller is configured to adjust the shift time of the transmission using the first shift pattern.

10. The apparatus of claim 4, wherein when braking occurs while the vehicle is not traveling at a high constant speed, the shift controller is configured to adjust the shift time of the transmission using the first shift pattern.

11. The apparatus of claim 1, wherein when a road is a road for the exclusive use of motor vehicles, a traffic flow of the road is smooth, a speed limit of the road is greater than a reference value, and the average traveling speed of the vehicle is greater than a reference value, the running state obtaining unit is configured to determine that the vehicle is traveling at a high constant speed.

12. A method for a shift control of a vehicle, comprising:
- obtaining, by a controller, road information regarding a road on which the vehicle is traveling and traffic information;
- obtaining, by the controller, front vehicle information including a speed of a front vehicle traveling in front of the vehicle;
- obtaining, by the controller, an average traveling speed of the vehicle;
- determining, by the controller, whether the vehicle is traveling at a high constant speed based on at least one of the road information, the traffic information, and the average traveling speed; and
- adjusting, by the controller, a shift time of a transmission based on the front vehicle information when braking occurs during high constant speed traveling of the vehicle.

13. The method of claim 12, wherein the adjusting of the shift time includes:
- when the front vehicle is not decelerating and a speed of the front vehicle is within a predetermined range, delaying the shift time of the transmission.

14. The method of claim 13, wherein the adjusting of the shift time further includes:
- when the front vehicle is decelerating or a speed of the front vehicle is beyond a predetermined range, operating the transmission to enter an early shift.

15. The method of claim 12, further comprising:
- when braking occurs when the front vehicle is not detected or when the speed of the vehicle is less than a reference value, operating the transmission to enter an early shift.

16. The method of claim 12, wherein the adjusting of the shift time includes:
- when braking occurs during high constant speed traveling of the vehicle, selecting one of a first shift pattern and a second shift pattern set to delay the shift time upon deceleration compared to the first shift pattern based on the front vehicle information; and
- operating the transmission to enter an early shift using the selected shift pattern between the first and second shift patterns.

17. The method of claim 16, wherein the selecting includes:
- when the front vehicle is not decelerating and a speed of the front vehicle is within a speed range that corresponds to a current gear stage of the vehicle in the second shift pattern, selecting the second shift pattern.

18. The method of claim 16, wherein the selecting includes:
- when the front vehicle is decelerating or a speed of the front vehicle is beyond a speed range that corresponds to a current gear stage of the vehicle in the second shift pattern, selecting the first shift pattern.

19. The method of claim 16, further comprising:
- when braking occurs when the front vehicle is not detected or when the speed of the vehicle is less than a reference value, operating the transmission to enter an early shift using the first shift pattern.

20. The method of claim 12, wherein the determining of whether the vehicle is traveling at the high constant speed includes:
- when a road type is a road for the exclusive use of motor vehicles, a traffic flow of the road is smooth, a speed limit of the road is greater than a reference value, and the average traveling speed of the vehicle is greater than a reference value, determining that the vehicle is traveling at a high constant speed.

* * * * *